(12) United States Patent
Blea et al.

(10) Patent No.: US 9,298,567 B2
(45) Date of Patent: Mar. 29, 2016

(54) SYSTEM AVAILABILITY IN PPRC FAILOVER ENVIRONMENTS

(71) Applicant: International Business Machines Corporation, Armonk, NY (US)

(72) Inventors: David R. Blea, Round Rock, TX (US); Tri M. Hoang, Poughkeepsie, NY (US); Gregory E. McBride, Vail, AZ (US); Carol S. Mellgren, Tucson, AZ (US); Tabor R. Powelson, Poughkeepsie, NY (US); William J. Rooney, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 67 days.

(21) Appl. No.: 14/457,143

(22) Filed: Aug. 12, 2014

(65) Prior Publication Data

US 2016/0048435 A1 Feb. 18, 2016

(51) Int. Cl.
*G06F 11/00* (2006.01)
*G06F 11/20* (2006.01)

(52) U.S. Cl.
CPC .................................. *G06F 11/2069* (2013.01)

(58) Field of Classification Search
USPC .................................................. 714/15, 2, 1
See application file for complete search history.

(56) References Cited

U.S. PATENT DOCUMENTS

| 8,015,436 | B2 | 9/2011 | Winokur | |
|---|---|---|---|---|
| 8,065,481 | B1 * | 11/2011 | Hiller | G06F 3/0611 711/100 |
| 8,335,899 | B1 | 12/2012 | Meiri et al. | |
| 8,578,204 | B1 * | 11/2013 | Ortenberg | G06F 11/1425 714/2 |
| 8,775,753 | B2 * | 7/2014 | Gundy | G06F 11/2064 707/664 |
| 2006/0005074 | A1 * | 1/2006 | Yanai | G06F 3/0601 714/6.32 |
| 2014/0019802 | A1 * | 1/2014 | Rooney | G06F 11/2092 714/6.3 |

* cited by examiner

*Primary Examiner* — Sarai Butler
(74) *Attorney, Agent, or Firm* — Nelson and Nelson; Daniel P. Nelson; Alexis V. Nelson

(57) ABSTRACT

A method for improving system availability in data replication environments is disclosed herein. In one embodiment, such a method includes detecting a suspend trigger, where the suspend trigger indicates that data mirroring between a primary volume and a secondary volume has been suspended. The method further detects a swap trigger some time after detecting the suspend trigger. The swap trigger indicates that I/O directed to the primary volume has failed. In the event the swap trigger is detected within a specified amount of time after detecting the suspend trigger, the method redirects I/O from the primary volume to the secondary volume. A corresponding system and computer program product are also disclosed.

20 Claims, 7 Drawing Sheets

SYSTEM AVAILABILITY IN PPRC FAILOVER ENVIRONMENTS

BACKGROUND

1. Field of the Invention

This invention relates to systems and methods for increasing system availability in Peer-to-Peer-Remote-Copy ("PPRC") environments.

2. Background of the Invention

In data replication environments such as Peer-to-Peer-Remote-Copy ("PPRC") environments, data is mirrored from a primary storage device to a secondary storage device to maintain two consistent copies of the data. The primary and secondary storage devices may be located at different sites, perhaps hundreds or even thousands of miles away from one another. In the event the primary storage device fails, I/O may be redirected to the secondary storage device, thereby enabling continuous operations. When the primary storage device is repaired, I/O may be redirected back to the former primary storage device. The process of redirecting I/O from the primary storage device to the secondary storage device when a failure or other event occurs may be referred to as a swap or HyperSwap.

HyperSwap is a function provided by IBM's z/OS operating system that provides continuous availability for disk failures by maintaining synchronous copies of primary disk volumes on one or more secondary storage controllers. When a disk failure is detected at a primary site, a host system running the z/OS operating system identifies HyperSwap managed volumes. Instead of rejecting I/O requests, the host system uses the HyperSwap function to switch (or swap) information in internal control blocks so that I/O requests are driven against synchronous copies at the secondary site. Since the secondary volumes are identical copies of the primary volumes prior to the failure, the I/O requests will succeed with minimal (i.e. a slight delay in I/O response time) impact on the issuing applications. This functionality masks disk failures from applications and ideally avoids application or system outages. An event which initiates a HyperSwap may be referred to as a "swap trigger."

In HyperSwap environments, communication links between primary and secondary volumes may fail, thereby making it impossible to mirror data between the volumes. Such an event may be referred to as a "suspend trigger" since it may cause mirroring to be suspended between the primary and secondary volumes. When a suspend trigger is detected at a primary or secondary storage controller, the storage controller may notify a host system that mirroring has been suspended. The primary storage controller may in turn delay I/O requests to affected volumes of the primary storage controller. This delay provides the host system the opportunity to suspend all mirroring to the secondary site in order to ensure a consistent copy of data exists at the secondary site, before resuming I/O to the primary site. Since mirroring is suspended, the host system will disable HyperSwap since identical copies of the data no longer exist at the primary and secondary sites.

In certain cases, one or more of the swap trigger and suspend trigger may be caused by a "rolling disaster," where one piece of equipment is affected prior to another. Such a "rolling disaster" may be caused by a fire, flood, earthquake, power failure, or the like. In such cases, a swap trigger and suspend trigger may occur at nearly the same point in time. Current HyperSwap processing depends upon the order in which the events are detected at a host system. If the swap trigger is detected first, a HyperSwap will occur. In such cases, systems that are not impacted by the rolling disaster may survive. However, if the suspend trigger is detected first, the HyperSwap feature will be disabled and no HyperSwap will occur. In such a case, all systems will likely fail, particularly if volumes affected by the disaster are critical. In a rolling disaster, the order in which the triggers are detected at a host system cannot be predicted, making it impossible to predict whether systems that are unaffected by the disaster will HyperSwap and survive the disaster, or have HyperSwap disabled and fail.

In view of the foregoing, what are needed are systems and methods to increase the likelihood that systems will survive a rolling disaster or other similar event in PPRC environments regardless of the order in which a swap trigger and suspend trigger are detected. Ideally, such systems and methods will preserve as much as possible normal behavior for events other than rolling disasters, such as in cases where one of a swap trigger and/or suspend trigger occurs without the other, or a swap trigger and suspend trigger are temporally separated from one another.

SUMMARY

The invention has been developed in response to the present state of the art and, in particular, in response to the problems and needs in the art that have not yet been fully solved by currently available systems and methods. Accordingly, the invention has been developed to improve system availability in Peer-to-Peer-Remote-Copy ("PPRC") environments. The features and advantages of the invention will become more fully apparent from the following description and appended claims, or may be learned by practice of the invention as set forth hereinafter.

Consistent with the foregoing, a method for improving system availability in Peer-to-Peer-Remote-Copy ("PPRC") environments is disclosed herein. In one embodiment, such a method includes detecting a suspend trigger, where the suspend trigger indicates that data mirroring between a primary volume and a secondary volume has been suspended. The method further detects a swap trigger some time after detecting the suspend trigger. The swap trigger indicates that I/O directed to the primary volume has failed. In the event the swap trigger is detected within a specified amount of time after detecting the suspend trigger, the method redirects I/O from the primary volume to the secondary volume. A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
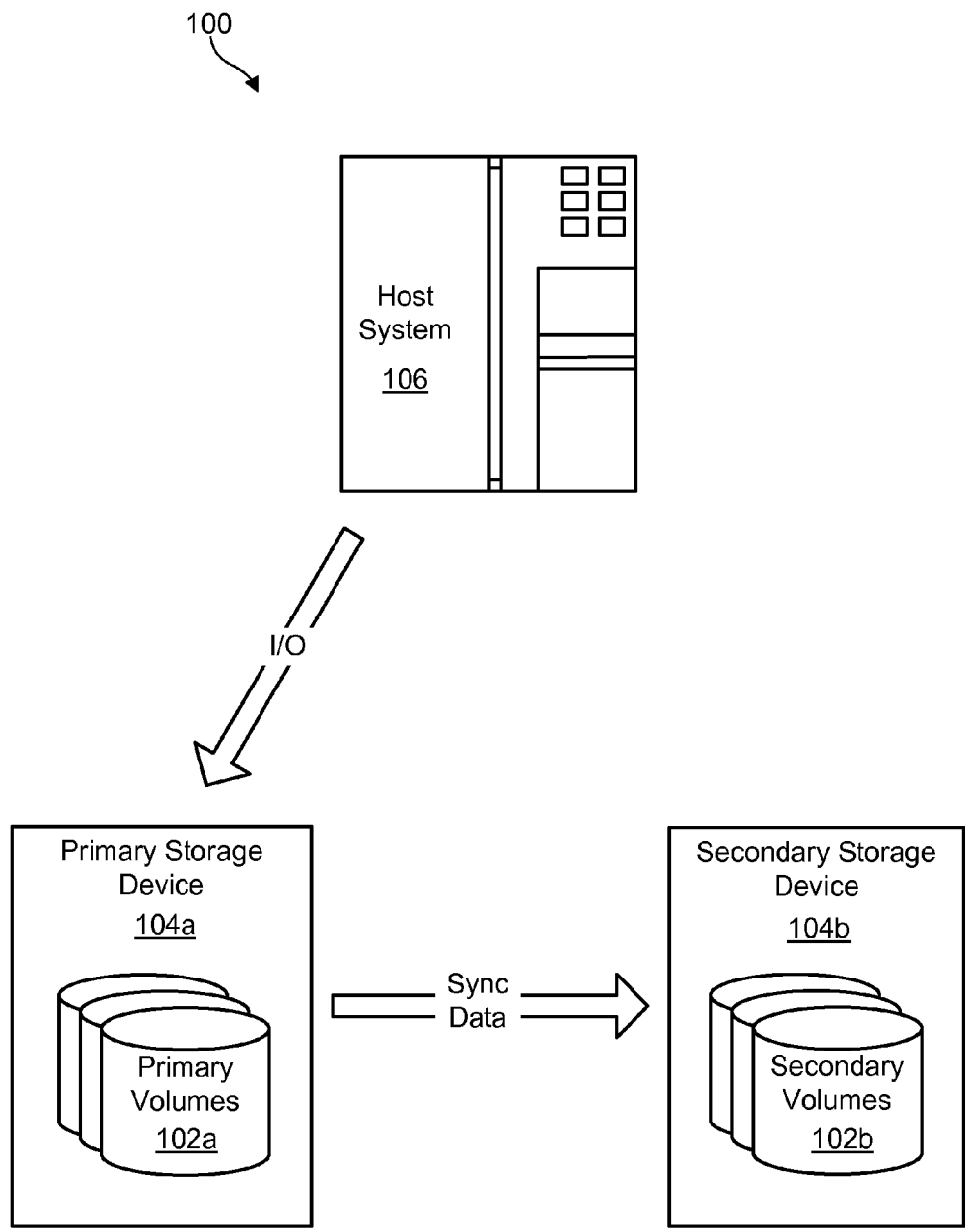
FIG. 1 is a high-level block diagram showing one example of a Peer-to-Peer-Remote-Copy ("PPRC") environment.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring to FIG. 1, one example of a data replication system 100, in this embodiment a PPRC system 100, is illustrated. The PPRC system 100 is presented to show an example of an architecture in which embodiments of the invention might operate, and is not intended to be limiting. In general, the PPRC system 100 establishes a mirroring relationship between one or more primary volumes 102a and one or more secondary volumes 102b. Once this relationship is established, a consistent copy of data is maintained on the volumes 102a, 102b. The primary and secondary volumes 102a, 102b may be located on the same storage device 104, although the volumes 102a, 102b are typically located on separate storage devices 104a, 104b located some distance (e.g., several miles to thousands of miles) from one another. Channel extension equipment may be located between the storage devices 104a, 104b, as needed, to extend the distance over which the storage devices 104a, 104b may communicate.

The PPRC system 100 may, in certain embodiments, be configured to operate in either a synchronous or asynchronous manner. When operating synchronously, an I/O may only be considered complete when it has completed successfully on both the primary and secondary storage devices 104a, 104b. As an example, in such a configuration, a host system 106 may initially send a write request to the primary storage device 104a. This write operation may be performed on the primary storage device 104a. The primary storage device 104a may, in turn, transmit a write request to the secondary storage device 104b. The secondary storage device 104b may execute the write operation and return a write acknowledge signal to the primary storage device 104a. Once the write has been performed on both the primary and secondary storage devices 104a, 104b, the primary storage device 104a returns a write acknowledge signal to the host system 106. The I/O is considered complete when the host 106 receives the write acknowledge signal.

By contrast, asynchronous operation may only require that the write complete on the primary storage device 104a before the write is considered complete. That is, a write acknowledgement may be returned to the host system 106 when the write has completed on the primary storage device 104a, without requiring that the write be completed on the secondary storage device 104b. The write may then be mirrored to the secondary storage device 104b as time and resources allow to create a consistent copy on the secondary storage device 104b.

In the event the primary storage device 104a fails, I/O may be redirected to the secondary storage device 104b, thereby enabling continuous operations. This process may be referred to as a swap or HyperSwap. Since the secondary storage device 104b contains a consistent copy of the data on the primary storage device 104a, the redirected I/O (e.g., reads and writes) may be performed on the copy of the data on the secondary storage device 104b. When the primary storage device 104a is repaired or resumes operation, mirroring may be restarted in the opposite direction to make device 104b the new primary storage device and device 104a the new secondary storage device.

Although the systems and methods disclosed herein will be discussed primarily in association with PPRC systems, the systems and methods may also be applicable, in various forms, to other analogous data replication technologies, regardless of the manufacturer, product name, or components or component names associated with the technology. Any data replication technology that could benefit from one or more embodiments of the invention is, therefore, deemed to fall within the scope of the invention.

Figure 2:
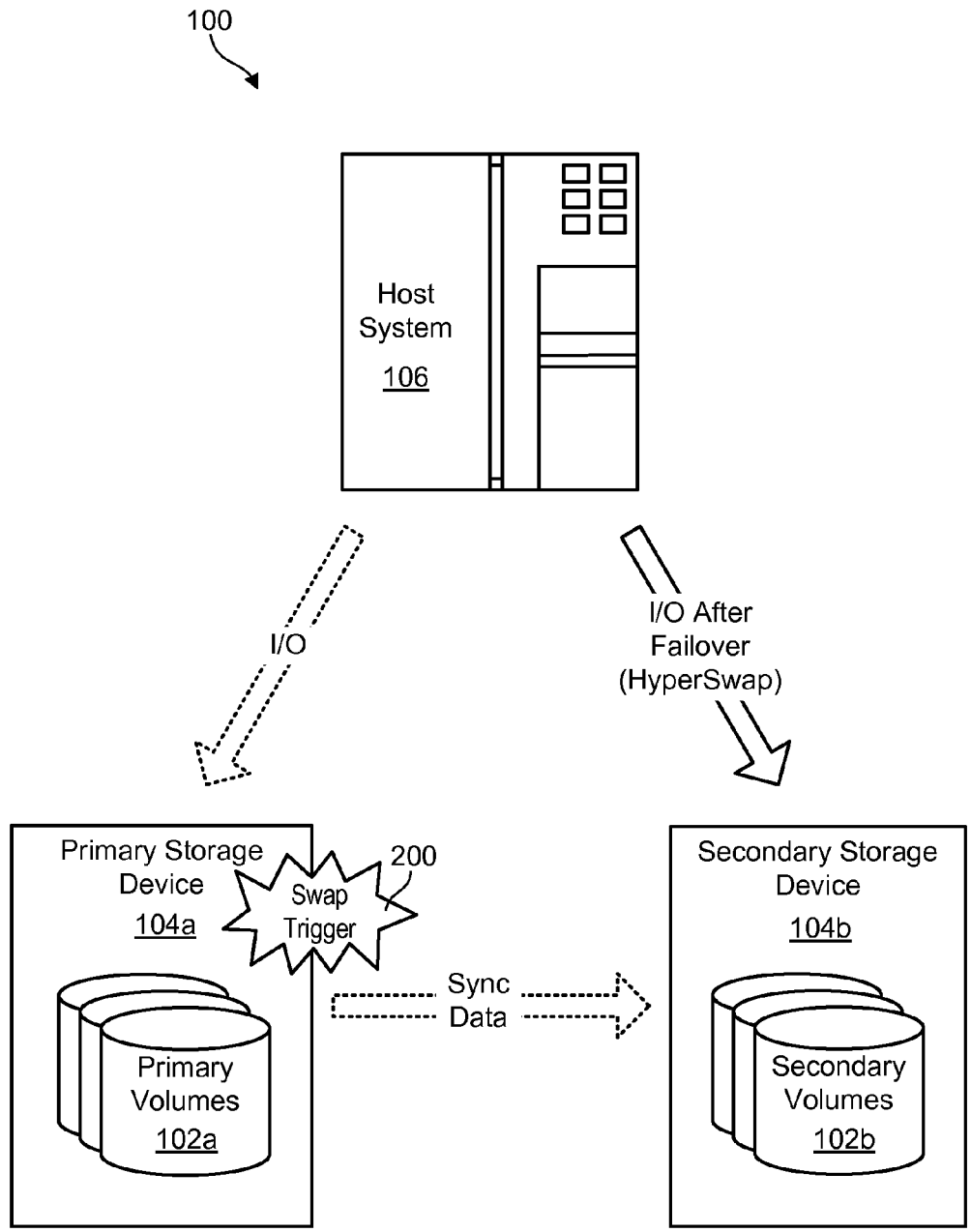
FIG. 2 is a high-level block diagram showing behavior of the system in response to detecting a swap trigger.

Referring to FIG. 2, as previously mentioned, HyperSwap is a function provided by IBM's z/OS operating system that provides continuous availability for disk failures by maintaining synchronous copies of data on primary disk volumes 102a on secondary disk volumes 102b. When a disk failure is detected at a primary site 104a, a host system 106 running the z/OS operating system identifies HyperSwap-managed volumes 102a at the primary site 104a. Instead of rejecting I/O requests, the host system 106 uses the HyperSwap function to switch (or swap) information in internal control blocks so that I/O requests are driven against synchronous copies at the secondary site 104b, as shown in FIG. 2. Such an operation may also be referred to as a "failover." Since the secondary volumes 102b contain identical copies of data in the primary volumes 102a prior to the failure, the I/O requests will succeed with minimal (i.e. a slight delay in I/O response time) impact on the issuing applications. This functionality masks disk failures from applications and ideally avoids application or system outages. An event which initiates a HyperSwap may be referred to as a "swap trigger" 200.

Figure 3:
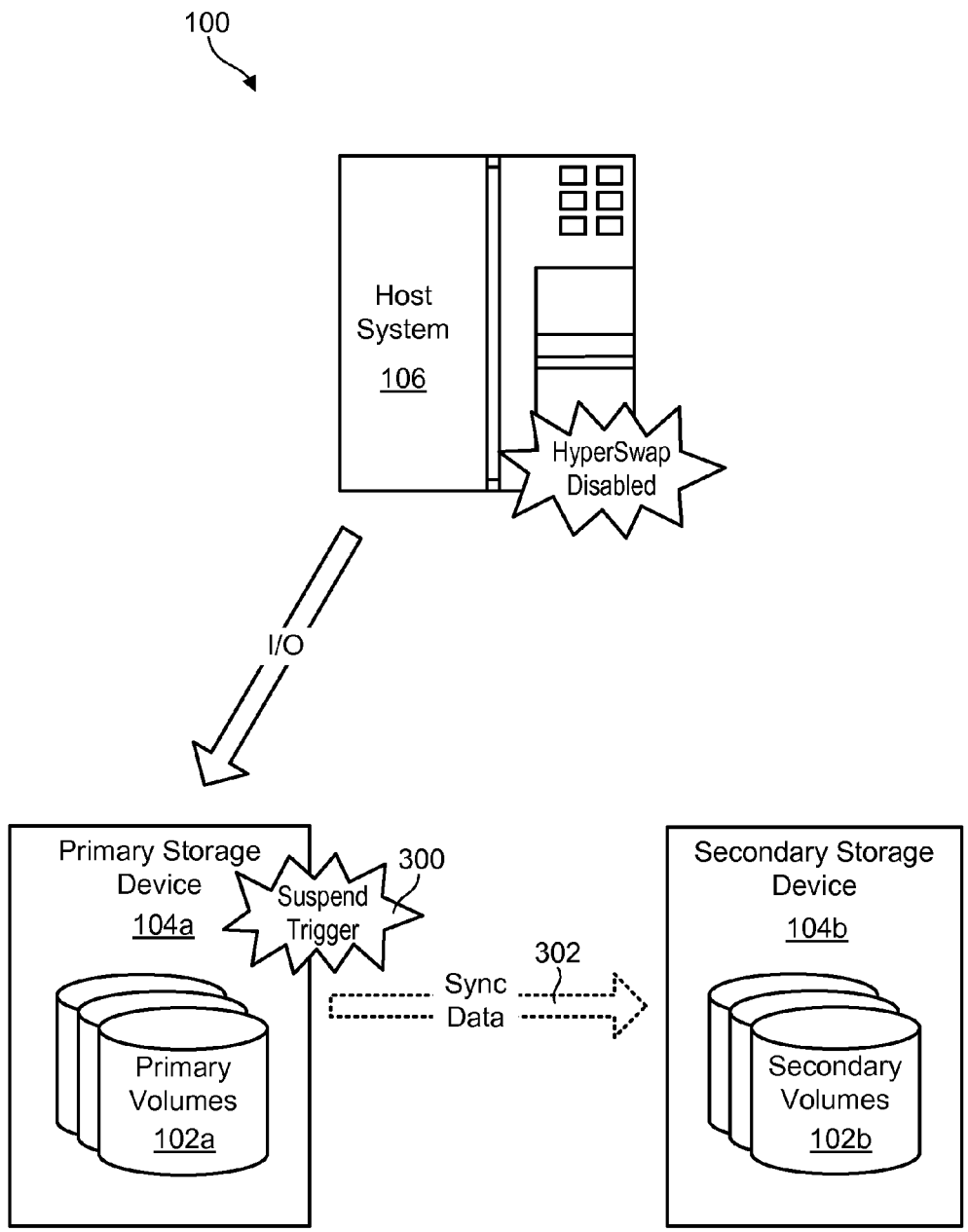
FIG. 3 is a high-level block diagram showing behavior of the system in response to detecting a suspend trigger.

Referring to FIG. 3, in HyperSwap environments, communication links 302 between primary volumes 102a and secondary volumes 102b may fail, thereby making it impossible to mirror data between the volumes 102a, 102b. Such an event may generate a "suspend trigger" 300 (e.g., a PPRC Suspended message from a storage system 104) since it may cause mirroring to be suspended between the primary and secondary volumes 102a, 102b. When a suspend trigger 300 is detected at a primary storage controller 104a or a secondary storage controller 104b, the storage controller 104a 104b may notify a host system 106 that mirroring has been suspended. The primary storage controller 104a may in turn delay I/O requests to the affected volumes 102a of the primary storage controller 104a. The delay provides the host system 106 the opportunity to suspend all mirroring to the secondary site 104b in order to ensure that a consistent copy of data exists at the secondary site 104b, before resuming I/O to the primary site 104a. Since mirroring is suspended, the host system 106 will disable HyperSwap since identical copies of the data no longer exist at the primary and secondary sites 104a, 104b. When the HyperSwap function is disabled, I/O will not be able to be redirected to the secondary site 104b even in the event a swap trigger 200 is detected.

Figure 4:
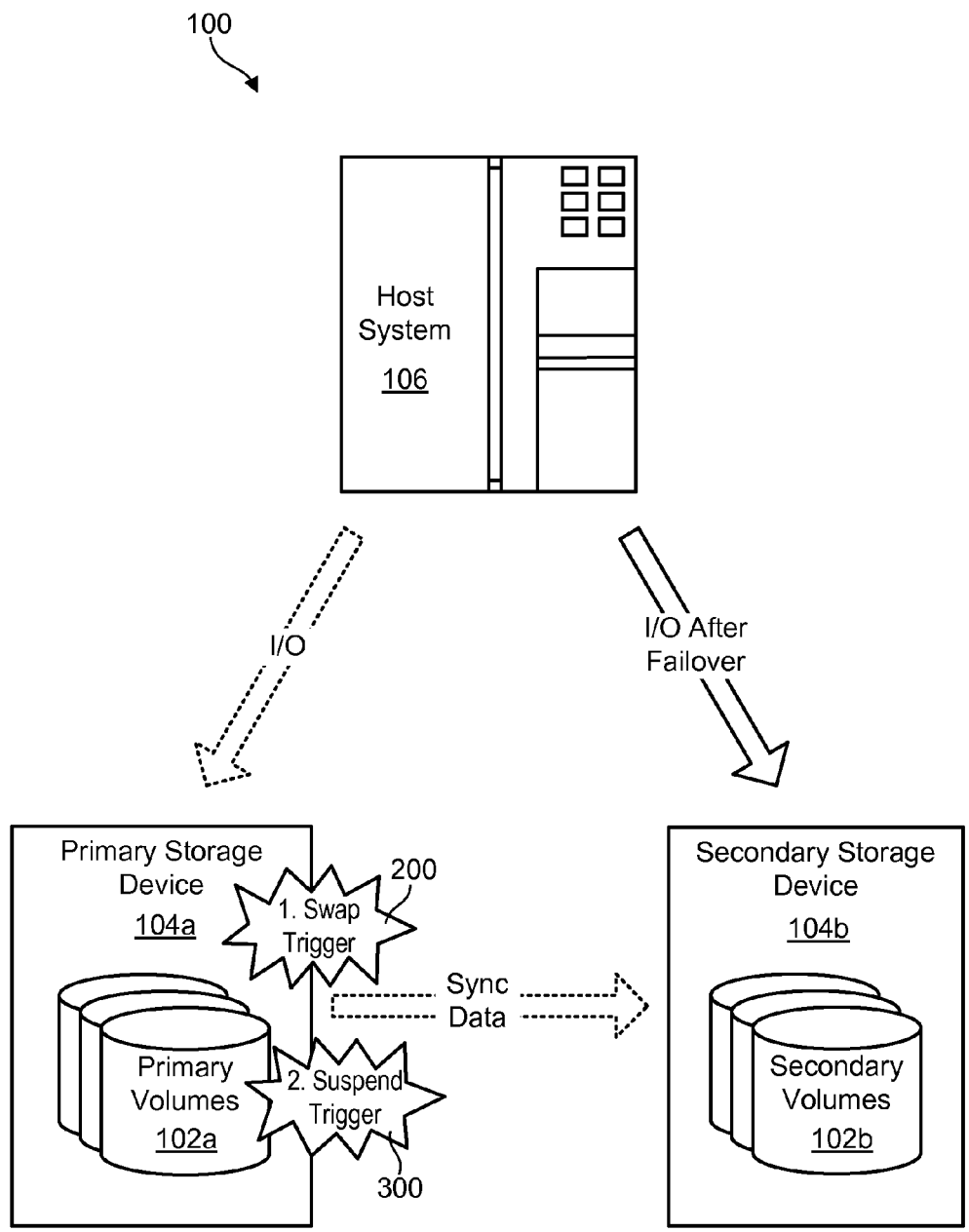
FIG. 4 is a high-level block diagram showing behavior of the system in response to detecting a suspend trigger after a swap trigger.
Figure 5:
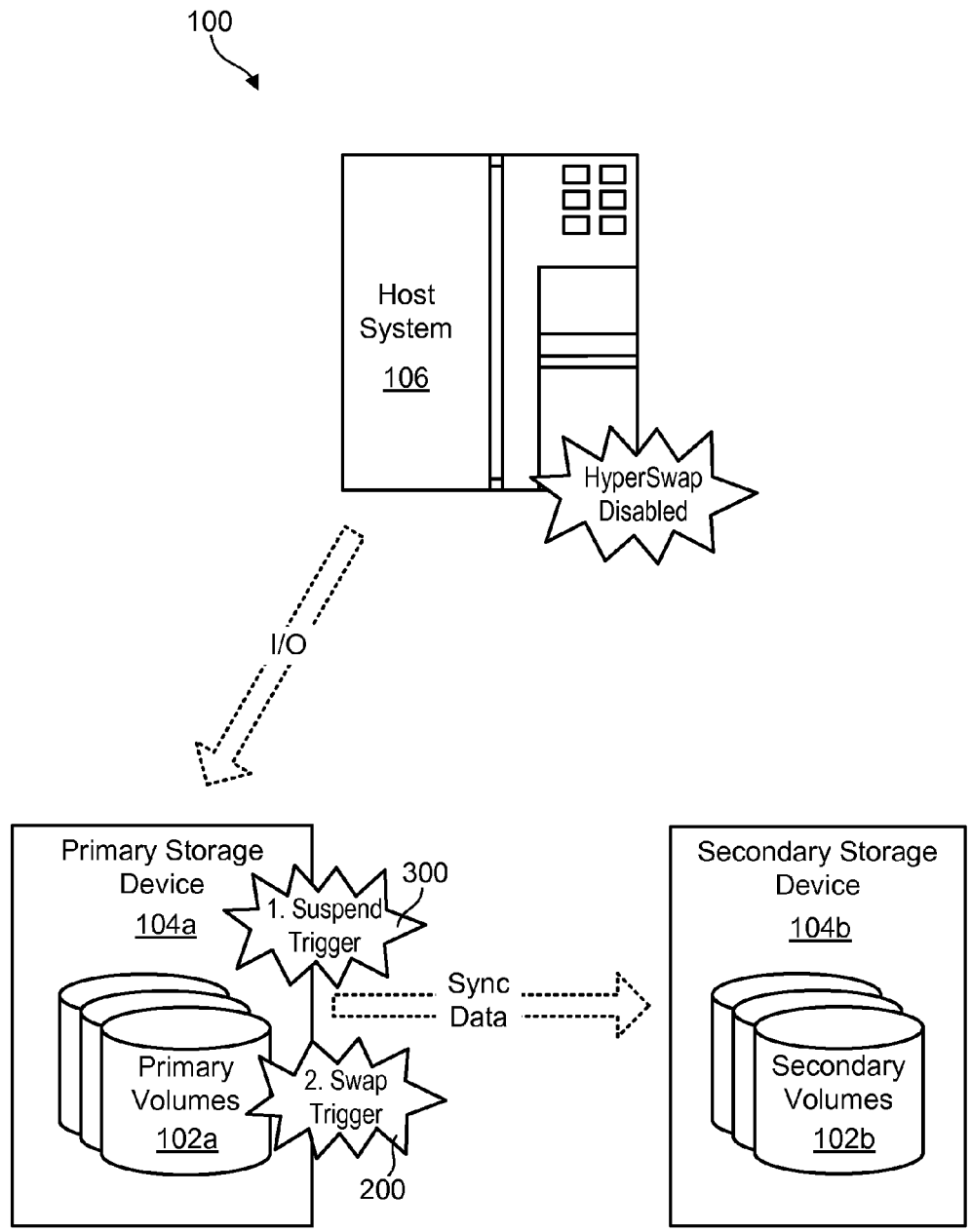
FIG. 5 is a high-level block diagram showing conventional behavior of the system in response to detecting a swap trigger after a suspend trigger.

Referring to FIGS. 4 and 5, in certain cases, one or more of a swap trigger 200 and suspend trigger 300 may be caused by a "rolling disaster," where one piece of equipment is affected prior to another. Such a "rolling disaster" may be caused by a fire, flood, earthquake, power failure, or the like. In cases where a swap trigger 200 and suspend trigger 300 occur at nearly the same point in time (such as in rolling disaster or other similar event), current HyperSwap processing depends upon the order in which the events 200, 300 are detected at a host system 106. If the swap trigger 200 is detected first, a HyperSwap will occur. In such cases, systems that are not impacted by the rolling disaster may survive. However if the suspend trigger 300 is detected first, the HyperSwap feature will be disabled and no HyperSwap will occur. In such a case, all systems will likely fail, particularly if volumes affected by the disaster are critical. In a rolling disaster, the order in which the triggers 200, 300 are detected at a host system 106 cannot be predicted, making it impossible to predict whether systems that are unaffected by the disaster will HyperSwap and survive the disaster, or have HyperSwap disabled and fail.

FIG. 4 shows a scenario where a swap trigger 200 is detected prior to a suspend trigger 300. In such a scenario, a swap (e.g., HyperSwap) occurs, thereby allowing I/O to be redirected to a secondary site 104b. The host system 106 and other systems may continue operating without crashing. FIG. 5, by contrast, shows a scenario where a suspend trigger 300 is detected prior to a swap trigger 200. In such a scenario, swap (e.g., HyperSwap) capability is disabled, thereby preventing I/O from being redirected to a secondary site 104b. Because the host system 106 and other systems or applications may be unable to complete I/O in such a scenario, these systems may fail or crash.

Figure 6:
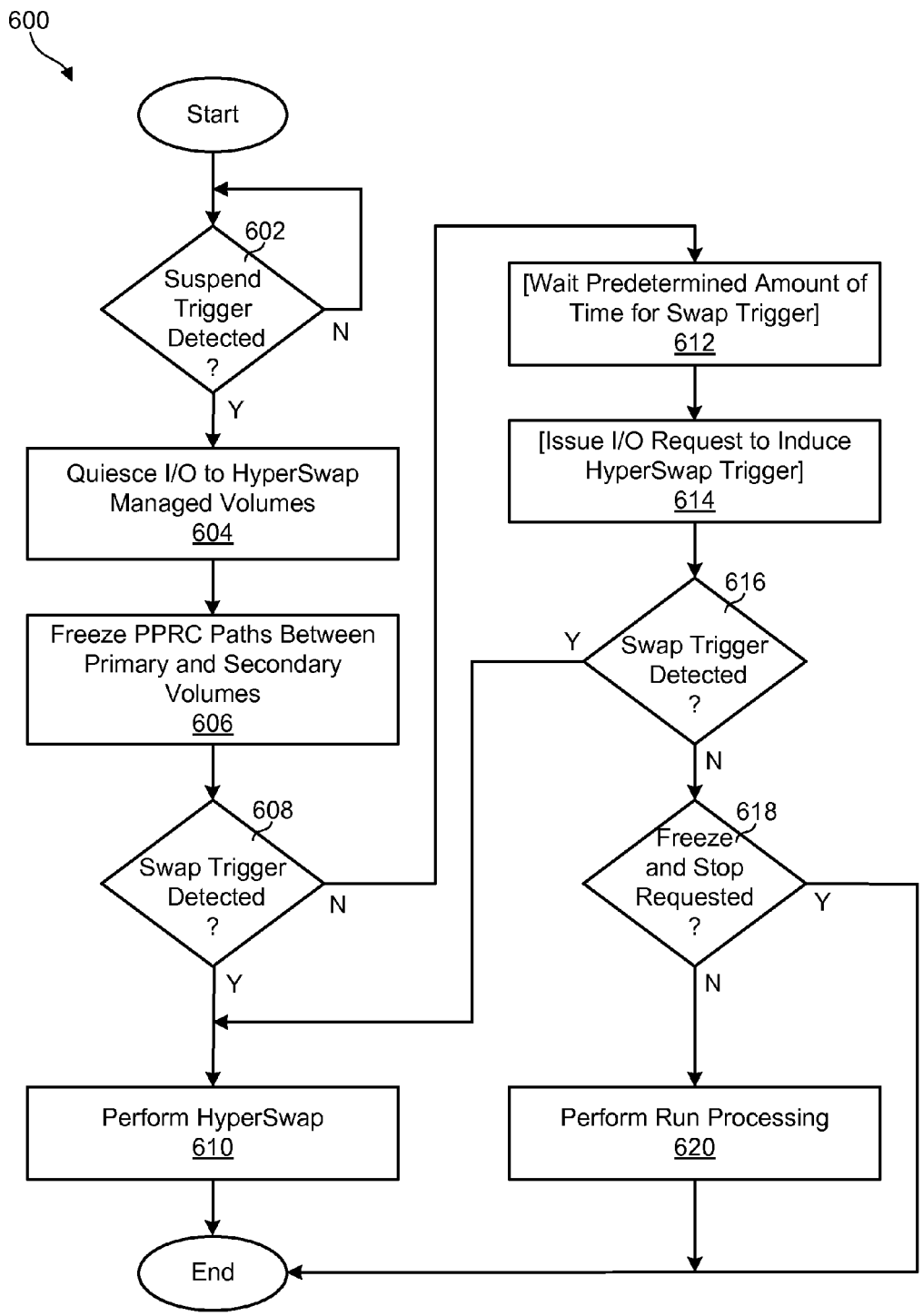
FIG. 6 is a process flow diagram showing one embodiment of a method for improving system availability.

Referring to FIG. 6, in view of the scenarios shown in FIGS. 4 and 5, a methodology is needed to increase the likelihood that systems will survive a rolling disaster or other similar event regardless of the order in which a swap trigger 200 and suspend trigger 300 are detected. Ideally, such a methodology will preserve as much as possible normal behavior for events other than rolling disasters, such as in cases where one of a swap trigger 200 and/or suspend trigger 300 occurs without the other, or a swap trigger 200 and suspend trigger 300 are temporally separated from one another. One example of such a methodology is illustrated in FIG. 6.

As shown in FIG. 6, one embodiment of a method 600 in accordance with the invention may initially determine 602 whether a suspend trigger 300 has been detected. If a suspend trigger 300 has been detected, the method 600 may quiesce 604 (i.e., temporarily disable) I/O to HyperSwap-managed volumes 102a on the primary storage device 104a. This may be accomplished using an applicable method for the current operating system, such as by raising the UCB (Unit Control Block) levels of all HyperSwap-managed volumes 102a to prevent any new I/O requests from being initiated to these volumes 102a, as well as draining I/O requests from any suspended channel programs associated with the volumes 102a. The method 600 may then suspend 606 PPRC paths between the primary and secondary volumes 102a, 102b. In certain embodiments, this may be accomplished by issuing a "Freeze PPRC Group" command to the primary volumes 102a to cause the volumes 102a to enter an Extended Long Busy (ELB) state. At this point (after the quiesce and freeze steps 604, 606 have been performed), data in the primary and secondary volumes 102a, 102b should be consistent.

At step 608, the method 600 determines if a swap trigger 200 (i.e., no paths condition to primary volumes 102a) was detected during the quiesce and freeze steps 604, 606, which are performed as part of normal suspend processing. If so, instead of proceeding with suspend processing and disabling HyperSwap functionality, the method 600 validates connectivity to the secondary volumes 102b and performs 610 a HyperSwap operation by redirecting I/O from the primary site 104a to the secondary site 104b.

If the swap trigger 200 has not been detected, one or more additional steps 612, 614 may optionally be performed to wait for or induce a swap trigger 200. For example, the method 600 may wait 612 a specified amount of time (e.g., one or several seconds) for a swap trigger 200 to be detected. The amount of time may be a fixed value or a variable value, such as a user-configurable value. Alternatively, or additionally, the method 600 may issue 614 a special I/O request (e.g., a NOOP CCW command capable of penetrating the Extended Long Busy state) to the primary volumes 102a in an attempt to induce a swap trigger 200. If the I/O completes successfully (i.e., a swap trigger 200 is not produced), this may indicate that the primary storage device 104a is still up and functional and normal suspend processing may continue at steps 618, 620. However, if the I/O fails, a swap trigger 200 will ideally be generated.

If a swap trigger 200 is detected at step 616, the method 600 may perform 610 the HyperSwap operation as previously discussed. However, if a swap trigger 200 is not detected, the method 600 may continue normal suspend processing. This may include determining 618 whether a customer's established policy is "Freeze and Stop" or "Freeze and Run." If the policy is "Freeze and Stop," processing ends. This will cause all I/O to the affected storage devices 104a, 104b to be held indefinitely, typically in order to give a customer an opportunity to determine a cause of the suspend trigger 300 and react accordingly. If the policy is "Freeze and Run," I/O will eventually resume to the primary volumes 102a, even if mirroring to the secondary volumes 102b is not possible.

In more recent versions of z/OS and with storage systems that support the HyperSwap function, if a customer's policy is "Freeze and Stop," the HyperSwap function will take the additional step of querying the secondary storage system 104b in an attempt to determine the cause of the suspend trigger 300. If the suspend trigger 300 was caused by an event which the HyperSwap function determines does not indicate a site failure, it will perform 620 run processing (i.e. resume I/O to the primary volumes 102a) even though "Freeze and Stop" was specified.

Figure 7:
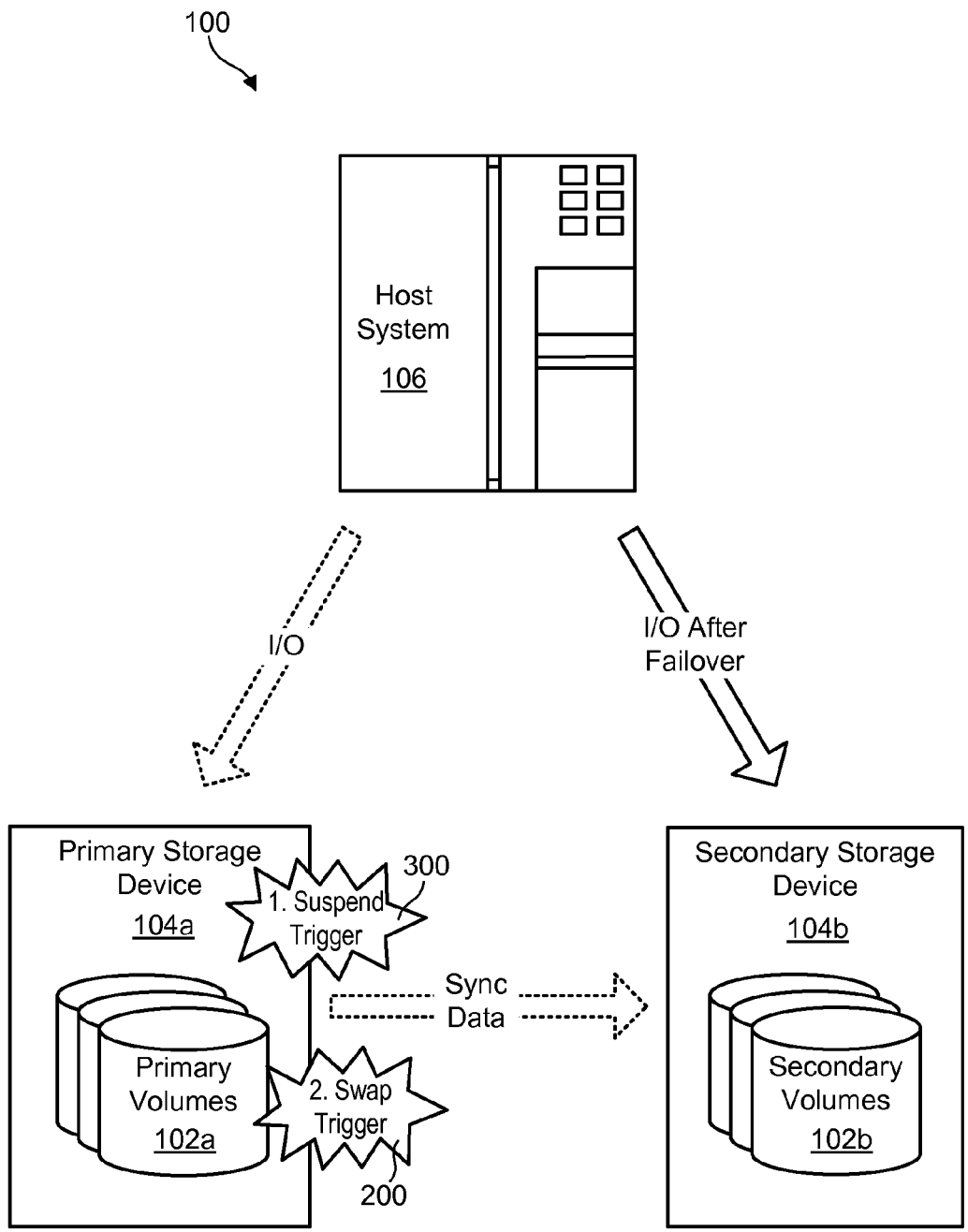
FIG. 7 is a high-level block diagram showing improved behavior of the system (compared to FIG. 5) when using the methodology of FIG. 6.

Referring to FIG. 7, upon implementing the methodology described in FIG. 6, a scenario such as that illustrated in FIG. 7 may occur. As shown in FIG. 7, a swap trigger 200 is detected after a suspend trigger 300. Assuming the swap trigger 200 is detected within a specified amount of time after detecting the suspend trigger 300, failover (e.g., HyperSwap) capability may be preserved as opposed to being disabled. Thus, even after a suspend trigger 300 is detected, a swap trigger 200 may cause a swap to occur, thereby allowing I/O to be redirected to a secondary storage device 104b. This may improve system availability and prevent systems from crashing or otherwise failing. Using such a methodology 600, normal behavior may be preserved for events other than rolling disasters, such as in cases where one of a swap trigger 200 and/or suspend trigger 300 occurs without the other, or a swap trigger 200 and suspend trigger 300 are temporally separated from one another.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for improving system availability in data replication environments, the method comprising:
   detecting a suspend trigger, the suspend trigger indicating that data mirroring between a primary volume and a secondary volume has been suspended;
   detecting a swap trigger after detecting the suspend trigger, the swap trigger indicating that I/O directed to the primary volume has failed; and
   in the event the swap trigger is detected within a specified amount of time of detecting the suspend trigger, redirecting I/O from the primary volume to the secondary volume.

2. The method of claim 1, wherein redirecting I/O from the primary volume to the secondary volume comprises initiating a swap function to redirect I/O from the primary volume to the secondary volume.

3. The method of claim 1, wherein the specified amount of time is an amount of time needed to perform at least one function after detection of the suspend trigger.

4. The method of claim 3, wherein the at least one function comprises a quiesce function and a freeze function.

5. The method of claim 1, wherein the specified amount of time is a user-configurable amount of time.

6. The method of claim 1, further comprising, after detecting the suspend trigger but before detecting the swap trigger, issuing at least one I/O request to the primary volume to induce the swap trigger.

7. The method of claim 1, wherein the swap trigger is an unplanned swap trigger.

8. A computer program product for improving system availability in data replication environments, the computer program product comprising a computer-readable medium having computer-usable program code embodied therein, the computer-usable program code comprising:
- computer-usable program code to detect a suspend trigger, the suspend trigger indicating that data mirroring between a primary volume and a secondary volume has been suspended;
- computer-usable program code to detect a swap trigger after detecting the suspend trigger, the swap trigger indicating that I/O directed to the primary volume has failed; and
- computer-usable program code to, in the event the swap trigger is detected within a specified amount of time of detecting the suspend trigger, redirect I/O from the primary volume to the secondary volume.

9. The computer program product of claim 8, wherein redirecting I/O from the primary volume to the secondary volume comprises initiating a swap function to redirect I/O from the primary volume to the secondary volume.

10. The computer program product of claim 8, wherein the specified amount of time is an amount of time needed to perform at least one function after detection of the suspend trigger.

11. The computer program product of claim 10, wherein the at least one function comprises a quiesce function and a freeze function.

12. The computer program product of claim 8, wherein the specified amount of time is a user-configurable amount of time.

13. The computer program product of claim 8, further comprising computer-usable program code to, after detecting the suspend trigger but before detecting the swap trigger, issue at least one I/O request to the primary volume to induce the swap trigger.

14. The computer program product of claim 8, wherein the swap trigger is an unplanned swap trigger.

15. A system for improving system availability in data replication environments, the system comprising:
- at least one processor;
- at least one memory device coupled to the at least one processor and storing instructions for execution on the at least one processor, the instructions enabling the at least one processor to:
  - detect a suspend trigger, the suspend trigger indicating that data mirroring between a primary volume and a secondary volume has been suspended;
  - detect a swap trigger after detecting the suspend trigger, the swap trigger indicating that I/O directed to the primary volume has failed; and
  - in the event the swap trigger is detected within a specified amount of time of detecting the suspend trigger, redirect I/O from the primary volume to the secondary volume.

16. The system of claim 15, wherein redirecting I/O from the primary volume to the secondary volume comprises initiating a swap function to redirect I/O from the primary volume to the secondary volume.

17. The system of claim 15, wherein the specified amount of time is an amount of time needed to perform at least one function after detection of the suspend trigger.

18. The system of claim 17, wherein the at least one function comprises a quiesce function and a freeze function.

19. The system of claim 15, wherein the specified amount of time is a user-configurable amount of time.

20. The system of claim 15, wherein the instructions further enable the at least one processor to, after detecting the suspend trigger but before detecting the swap trigger, issue at least one I/O request to the primary volume to induce the swap trigger.

* * * * *